US008803776B2

(12) United States Patent
Saito (10) Patent No.: US 8,803,776 B2
(45) Date of Patent: Aug. 12, 2014

(54) LIQUID CRYSTAL DISPLAY DEVICE

(75) Inventor: Taku Saito, Mobara (JP)

(73) Assignees: Japan Display Inc., Tokyo (JP);
Panasonic Liquid Crystal Display Co., Ltd., Hyogo-Ken (JP)

( * ) Notice: Subject to any disclaimer, the term of this patent is extended or adjusted under 35 U.S.C. 154(b) by 1324 days.

(21) Appl. No.: 12/038,857

(22) Filed: Feb. 28, 2008

(65) Prior Publication Data

US 2008/0225219 A1   Sep. 18, 2008

(30) Foreign Application Priority Data

Mar. 16, 2007   (JP) ................................. 2007-067805

(51) Int. Cl.
*G06F 3/041*   (2006.01)

(52) U.S. Cl.
USPC ............................... 345/87; 345/204; 345/1.1

(58) Field of Classification Search
USPC ........................................... 345/87, 204, 1.1
See application file for complete search history.

(56) References Cited

U.S. PATENT DOCUMENTS

| 5,946,545 | A  | * | 8/1999 | Bertin et al. | ..................... 438/15 |
| 6,628,243 | B1 | * | 9/2003 | Lyons et al. | ................... 345/1.1 |
| 7,184,003 | B2 | * | 2/2007 | Cupps et al. | ..................... 345/30 |
| 2004/0021616 | A1 | * | 2/2004 | Goto et al. | ..................... 345/1.1 |
| 2004/0140947 | A1 | * | 7/2004 | Tsuyuki et al. | ................. 345/1.1 |
| 2006/0244709 | A1 | * | 11/2006 | Lin | ............................... 345/100 |

FOREIGN PATENT DOCUMENTS

JP   2002-297105   10/2002

* cited by examiner

*Primary Examiner* — Grant Sitta
(74) *Attorney, Agent, or Firm* — Antonelli, Terry, Stout & Kraus, LLP.

(57) ABSTRACT

A liquid crystal display device that is used in a small portable device includes a driver circuit which is freely mounted because the mounting area is small. The liquid crystal display device includes a liquid crystal display element and the liquid crystal driver circuit. The liquid crystal driver circuit is mounted along one side of a liquid crystal display panel. The liquid crystal display panel is connected to a flexible printed circuit board mounted with a rewritable memory element. The memory element stores transition commands for various modes of the driver circuit. The driver circuit reads a transition command from the memory element using a simple command and executes a transition of any of the various modes to another one.

9 Claims, 7 Drawing Sheets

LIQUID CRYSTAL DISPLAY DEVICE

BACKGROUND OF THE INVENTION

1. Field of the Invention

The present invention relates to liquid crystal display devices and, more particularly, to a technique effectively applied to a driver circuit for a liquid crystal display device used as a display unit of a portable device.

2. Background Art

Thin-film-transistor (TFT) liquid crystal display devices have been widely used as display units of personal computers and televisions. Those liquid crystal display devices each include a liquid crystal display panel and a driver circuit for driving the liquid crystal display panel.

Small-sized liquid crystal display devices of the above-described type have been widely used as display units of portable devices, such as mobile phones. In the use of a liquid crystal display device as a display unit of a portable device, it is desired that the liquid crystal display device be capable of having more complicated display modes than those of related-art liquid crystal display devices.

JP-A-2002-297105 discloses the use of a partial display instruction to achieve partial display. Although an operation for partial display is disclosed in JP-A-2002-297105, controlling the operation using a command is not disclosed therein.

SUMMARY OF THE INVENTION

One of problems that come with miniaturization of portable devices is a decrease in space for mounting a driver circuit on a liquid crystal display device. Accordingly, compact and multifunctional driver circuits are developed. In related-art liquid crystal display devices, driver circuits are typically arranged along two sides of a display screen. There is a demand that driver circuits are arranged along only one side of a display screen and the driver circuits are integrated on a single chip to reduce the mounting area.

Furthermore, mobile phones each provide various display modes. Accordingly, control commands for various display modes transmitted from a control circuit to a driver circuit tend to be more complicated.

The present invention is made to solve the above-described problems and it is an object of the present invention to provide a technique for realizing a driver circuit that executes various display modes using simple control commands in a compact liquid crystal display device.

The above and other objects, features and advantages of the present invention will be apparent from the following detailed description in conjunction with the accompanying drawings.

A representative aspect of the present invention disclosed in the present application will be briefly described below.

A liquid crystal display device includes a liquid crystal display panel and a liquid crystal driver circuit. The liquid crystal driver circuit is mounted along one side of the liquid crystal display panel and includes a circuit for driving scanning signal lines and for driving video signal lines, those driver circuits being formed on a single chip. The liquid crystal display device further includes a memory element separated from the driver circuit. The memory element stores commands for controlling the driver circuit.

The driver circuit reads a command sequence from the memory element in response to an instruction supplied from outside and executes any of various display modes in accordance with the read command sequence.

Since the memory element is separated from the driver circuit, data can be easily recorded into the memory element. In addition, the content of the recorded data can be easily checked. Furthermore, complicated command sequences are recorded into the memory element. Consequently, a control circuit for controlling the liquid crystal display device can enable the liquid crystal display device to perform a desired display mode by issuing a simple instruction signal.

DETAILED DESCRIPTION OF THE EMBODIMENTS

According to an embodiment of the present invention, a liquid crystal display device includes a liquid crystal display panel and a liquid crystal driver circuit. The liquid crystal driver circuit is composed of a scanning signal circuit and a video signal circuit, these circuits being integrated on a single chip. The liquid crystal driver circuit is mounted along one side of the liquid crystal display panel.

The liquid crystal display device further includes a memory element that is separated from the liquid crystal driver circuit. The memory element stores a command sequence for setting a display mode of the liquid crystal driver circuit.

The liquid crystal driver circuit reads a necessary command sequence from the memory element in accordance with an instruction supplied from an external control circuit and executes the command sequence to perform any of various display modes.

An embodiment of the present invention will now be described below with reference to the drawings. In the drawings for explanation of embodiments, components having the same function are designated by the same reference numeral to avoid repeatedly explaining the same function.

Figure 1:
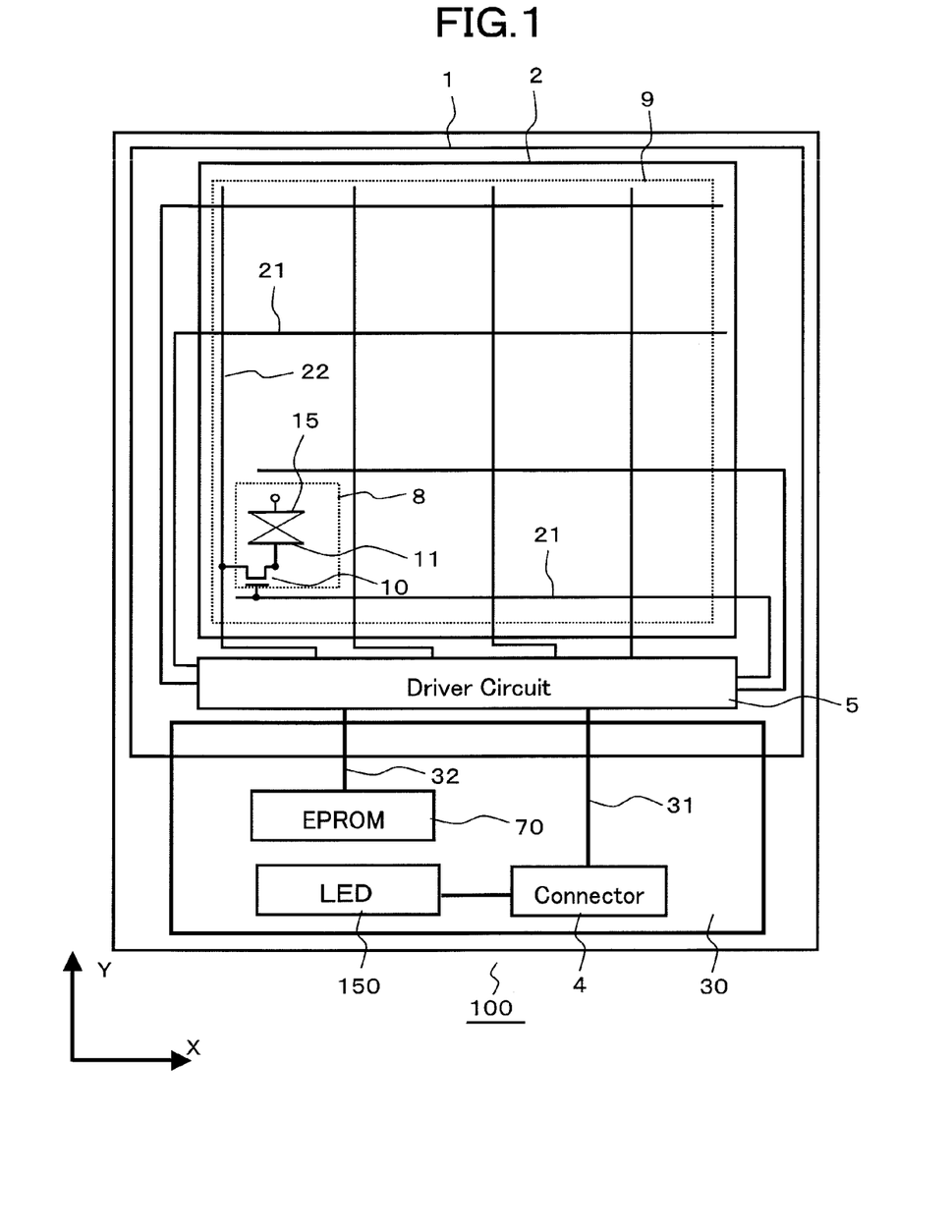
FIG. 1 is a schematic block diagram illustrating a liquid crystal display device according to an embodiment of the present invention.

FIG. 1 is a block diagram of the basic structure of a liquid crystal display device according to an embodiment of the present invention. Referring to FIG. 1, the liquid crystal display device, indicated at 100, includes a liquid crystal display panel 1, a driver circuit 5, and a flexible substrate 30.

The liquid crystal display panel 1 includes a thin-film-transistor (TFT) substrate 2 and a filter substrate (not shown)

In the TFT substrate 2, thin film transistors (hereinafter, TFTs) 10 and pixel electrodes 11 are arranged. In the filter substrate, a counter electrode 15 and color filters are arranged. The two substrates are joined to each other with a predetermined space therebetween using a frame-shaped seal disposed in the vicinity of the periphery of each substrate. The space defined by the seal between the two substrates is filled with a liquid crystal composition. A polarizer is attached to the outer surface of each substrate.

The present embodiment is similarly applicable to a so-called lateral electric field type liquid crystal display panel including a TFT substrate 2 in which a counter electrode 15 is arranged and a so-called vertical electric field type liquid crystal display panel including a filter substrate in which a counter electrode 15 is arranged.

Referring to FIG. 1, gate signal lines (also called scanning lines) 21 extending in the X direction in FIG. 1 are arranged in the Y direction. Drain signal lines (also called video signal lines) 22 extending in the Y direction in FIG. 1 are arranged in the X direction. Each pixel portion 8 is disposed in an area surrounded by the gate signal lines 21 and the drain signal lines 22.

The liquid crystal display panel 1 includes many pixel portions 8 arranged in a matrix. For the sake of easy understanding, one pixel portion 8 is shown in FIG. 1. The pixel portions 8, arranged in a matrix, constitute a display area 9. The pixel portions 8 serve as respective pixels of an image to display the image in the display area 9.

The TFT 10 in each pixel portion 8 has a source electrode, a drain electrode, and a gate electrode. The source electrode is connected to the pixel electrode 11. The drain electrode is connected to the video signal line 22. The gate electrode is connected to the scanning signal line 21. The TFT 10 functions as a switch for supplying a display voltage (gray scale voltage) to the pixel electrode 11.

The manner of naming "source" and "drain" may be reversed depending on bias current. In this embodiment, the terminal connected to the video signal line 22 is referred to as "drain".

The driver circuit 5 is disposed in a transparent insulating substrate (e.g., a glass substrate or a resin substrate) constituting the TFT substrate 2. The driver circuit 5 is connected to the scanning signal lines 21 and the video signal lines 22.

The TFT substrate 2 is connected to the flexible substrate 30. The flexible substrate 30 has a connector 4, a memory element 70, and a light emitting diode (LED) 150.

The connector 4, which is connected to an external signal line, receives a signal from outside. An interconnection line 31 is arranged between the connector 4 and the driver circuit 5 and a signal from the outside is supplied to the driver circuit 5 via the interconnection line 31.

The LED 150 receives a constant voltage through the connector 4. The LED 150 is used as a light source of the liquid crystal display device 100.

The memory element 70 may include an erasable and programmable read only memory (EPROM). Accordingly, the memory element 70 will also be referred to as "EPROM". The EPROM 70, serving as a rewritable memory element, stores data. The driver circuit 5 reads data stored in the EPROM 70 via an interconnection line 32 as necessary.

The memory element 70 is separated from the driver circuit 5 and is arranged in the flexible substrate 30. When an abnormal condition occurs in the memory element 70, therefore, the memory element 70 can be easily replaced. In addition, data specific to the liquid crystal display device 100 can be easily rewritten and replaced. Consequently, various liquid crystal display devices 100 can be manufactured.

A control signal transmitted from a controller (not shown) arranged outside the liquid crystal display device 100 and a power supply voltage supplied from an external power supply circuit (not shown) are supplied to the driver circuit 5 through the connector 4 and the interconnection line 31.

Signals supplied from the outside to the driver circuit 5 include various control signals, such as a clock signal, a display timing signal, a horizontal synchronizing signal, and a vertical synchronizing signal, RGB display data, and display-mode control commands. The driver circuit 5 drives the liquid crystal display panel 1 on the basis of an input signal.

The driver circuit 5 comprises a single-chip semiconductor integrated circuit (LSI). The driver circuit 5 includes an output circuit segment that outputs a scanning signal to the scanning signal lines 21 and an output circuit segment that outputs a video signal to the video signal lines 22. The driver circuit 5 sequentially supplies a selection voltage (scanning signal) at a "high" level to the scanning signal lines 21 in the liquid crystal display panel 1 every horizontal scanning period in response to a reference clock generated in the driver circuit 5. Consequently, each of the TFTs 10, connected to the scanning signal lines 21 in the liquid crystal display panel 1, electrically connects the corresponding pixel electrode 11 to the corresponding video signal line 22 for one horizontal scanning period.

The driver circuit 5 outputs a gray scale voltage, corresponding to a gray scale to be displayed in a pixel, to the video signal lines 22. When the TFT 10 is turned on (conduction state), the gray scale voltage (video signal) is supplied from the corresponding video signal line 22 to the pixel electrode 11. After that, when the TFT 10 is turned off, the gray scale voltage is held by the pixel electrode 11. The gray scale voltage is based on the luminance of a video image to be displayed in the pixel.

Figure 2:
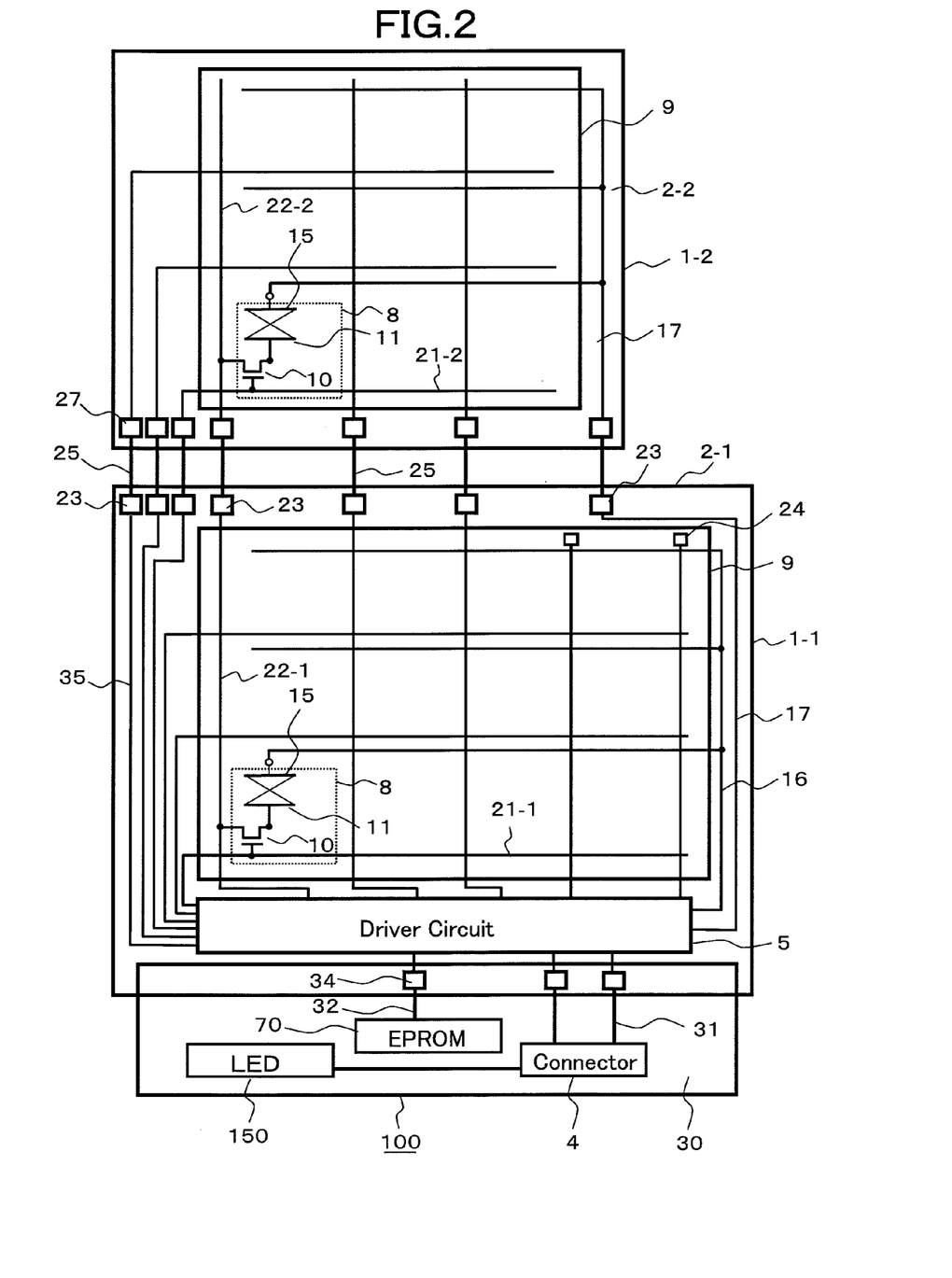
FIG. 2 is a schematic block diagram illustrating a liquid crystal display device according to another embodiment of the present invention.

FIG. 2 is a block diagram illustrating a liquid crystal display device according to another embodiment of the present invention. Referring to FIG. 2, the liquid crystal display device includes a first liquid crystal display panel 1-1 and a second liquid crystal display panel 1-2. For example, when those liquid crystal display panels are used in a mobile phone, the first liquid crystal display panel 1-1 serves as a main panel and the second liquid crystal display panel 1-2 serves as a sub-panel disposed on the rear of the mobile phone.

The first liquid crystal display panel 1-1 includes a plurality of scanning signal lines 21-1 extending in parallel to each other and a plurality of video signal lines 22-1 extending in parallel to each other in a manner similar to the above-described embodiment. The second liquid crystal display panel 1-2 also includes a plurality of scanning signal lines 21-2 extending in parallel to each other and a plurality of video signal lines 22-2 extending in parallel to each other. Each pixel portion 8 is disposed so as to correspond to the intersection of the scanning signal line 21 and the video signal line 22 in the first liquid crystal display panel 1-1. The second liquid crystal display panel 1-2 also includes a plurality of pixel portions 8 arranged in a matrix, the pixel portions 8 constituting a display area 9. Each pixel portion 8 includes a pixel electrode 11 and a TFT 10.

A driver circuit 5 drives not only the first liquid crystal display panel 1-1 but also the second liquid crystal display panel 1-2. Therefore, a signal is supplied from the first liquid crystal display panel 1-1 including the driver circuit 5 to the second liquid crystal display panel 1-2. A signal is output from each output terminal 23 of the first liquid crystal display panel 1-1 to the corresponding input terminal 27 of the second liquid crystal display panel 1-2 via an interconnection line 25.

Video signals are output from the output terminals 23 to the second liquid crystal display panel 1-2.

In addition, interconnection lines 35 for supply of scanning signals to the second liquid crystal display panel 1-2 are arranged in the first liquid crystal display panel 1-1. Scanning signals output from the driver circuit 5 are transmitted to the output terminals 23 via the respective interconnection lines 35. A gray scale voltage output from the driver circuit 5 is transferred to each output terminal 23 via the corresponding video signal line 22 and is then output from the output terminal 23. Accordingly, the video signal lines 22 connected to the driver circuit 5 are connected to the respective TFTs 10 in the display area 9 and further extend over the display area 9 to be connected to the respective output terminals 23.

When the number of the video signal line 22 in the first liquid crystal display panel 1-1 is larger than that of the video signal lines 22 in the second liquid crystal display panel 1-2, some of the video signal lines 22 in the first liquid crystal display panel 1-1 are not connected to the second liquid crystal display panel 1-2. In FIG. 2, line capacitance adjustment elements 24 are arranged to adjust the capacitance of each video signal line 22 which is not connected to the second liquid crystal display panel 1-2.

For example, the first and second liquid crystal display panels 1-1 and 1-2 maybe driven in such a manner that the scanning signal lines 21-1 in the first liquid crystal display panel 1-1 are sequentially scanned and the scanning signal lines 22-2 in the second liquid crystal display panel 1-2 are then sequentially scanned as if a single liquid crystal display panel is driven.

In this instance, the number of scanning lines to be driven in a case where the first liquid crystal display panel 1-1 is driven, that in a case where the second liquid crystal display panel 1-2 is driven, and that in a case where both of the first and second liquid crystal display panels are simultaneously driven differ from one another. Accordingly, it is desired that the driver circuit 5 be capable of setting a plurality of values as the numbers of scanning lines to be driven.

The driver circuit 5 further includes a graphic RAM, which will be described later. The graphic RAM stores display data. To drive the first and second liquid crystal display panels 1-1 and 1-2, it is necessary to designate an address in the graphic RAM according to each liquid crystal display panel and set which display data in the graphic RAM is output.

A counter-electrode signal line 17 supplies a voltage to counter electrodes 15. In each of the first and second liquid crystal display panels 1-1 and 1-2 in FIG. 2, the counter electrode 15 is arranged in a TFT substrate 2 and the counter-electrode signal line 17 is also arranged in the TFT substrate 2.

Achieving lower power consumption uses a partial display mode in which a minimum part of a screen is used for display. The partial display mode is used, for example, when a standby screen is displayed on a mobile phone. A fixed pattern display region used for display of the amount of remaining battery charge and the time is arranged in part of the display area of the liquid crystal display device and another region is used for display of an arbitrary pattern. In the partial display mode, only the fixed pattern display region is driven during power save.

In some cases, gray scale display with the number of gray scale levels to be displayed or lower is performed. For example, the following request is made: Although 262,144 colors can be expressed using the maximum number of gray scale levels, display with eight colors is performed in the first liquid crystal display panel 1-1, serving as the main panel, or the second liquid crystal display panel 1-2, serving as the sub-panel, while the standby screen is displayed for the purpose of lower power consumption.

As described above, the driver circuit 5 can cope with many various display modes, e.g., various display modes for lower power consumption, a display mode in which the main panel (the first liquid crystal display panel 1-1) is driven, a display mode in which the sub-panel (the second liquid crystal display panel 1-2) is driven, and a display mode in which the main panel (the first liquid crystal display panel 1-1) and the sub-panel (the second liquid crystal display panel 1-2) are simultaneously driven.

Accordingly, an instruction signal for designating any of the various display modes is supplied to the driver circuit 5 from the outside through a connector 4. The driver circuit 5 copes with the various display modes on the basis of instruction signals. As described above, the driver circuit 5 is allowed to have a control function, so that the multifunctional circuit is realized by a single IC chip. Since the driver circuit 5 is constructed by the single IC chip, the mounting area can be minimized.

Recently, mobile phones having various functions in addition to the above-described various display modes have been developed. It is therefore desired that a liquid crystal display device used in each mobile phone respond to various display modes.

Accordingly, the number of functions of a driver circuit is increased in order to cope with various liquid crystal display panels with different specifications and the driver circuit has to control those various functions. In the liquid crystal display device according to the present embodiment of the present invention, the driver circuit includes registers and sets the values of the registers to perform the various functions. Since the number of registers increases as the number of functions increases, setting the registers becomes complicated.

To prevent the complicated setting of many registers, an auto-sequence function may be used. However, since the effectiveness of the auto-sequence function is limited, the auto-sequence function is custom-designed for each liquid crystal display panel. Consequently, it is necessary to provide driver circuits with different specifications for respective liquid crystal display panels. Therefore, the use of the auto-sequence function is unsuitable for mass production.

According to the present embodiment, an EPROM 70 is provided separately from the driver circuit 5 to store the set values of the registers in order to operate the respective liquid crystal display panels. An external control circuit supplies an instruction signal to the driver circuit 5. The driver circuit 5 reads necessary set values from the EPROM 70 in accordance with the instruction signal.

Figure 3:
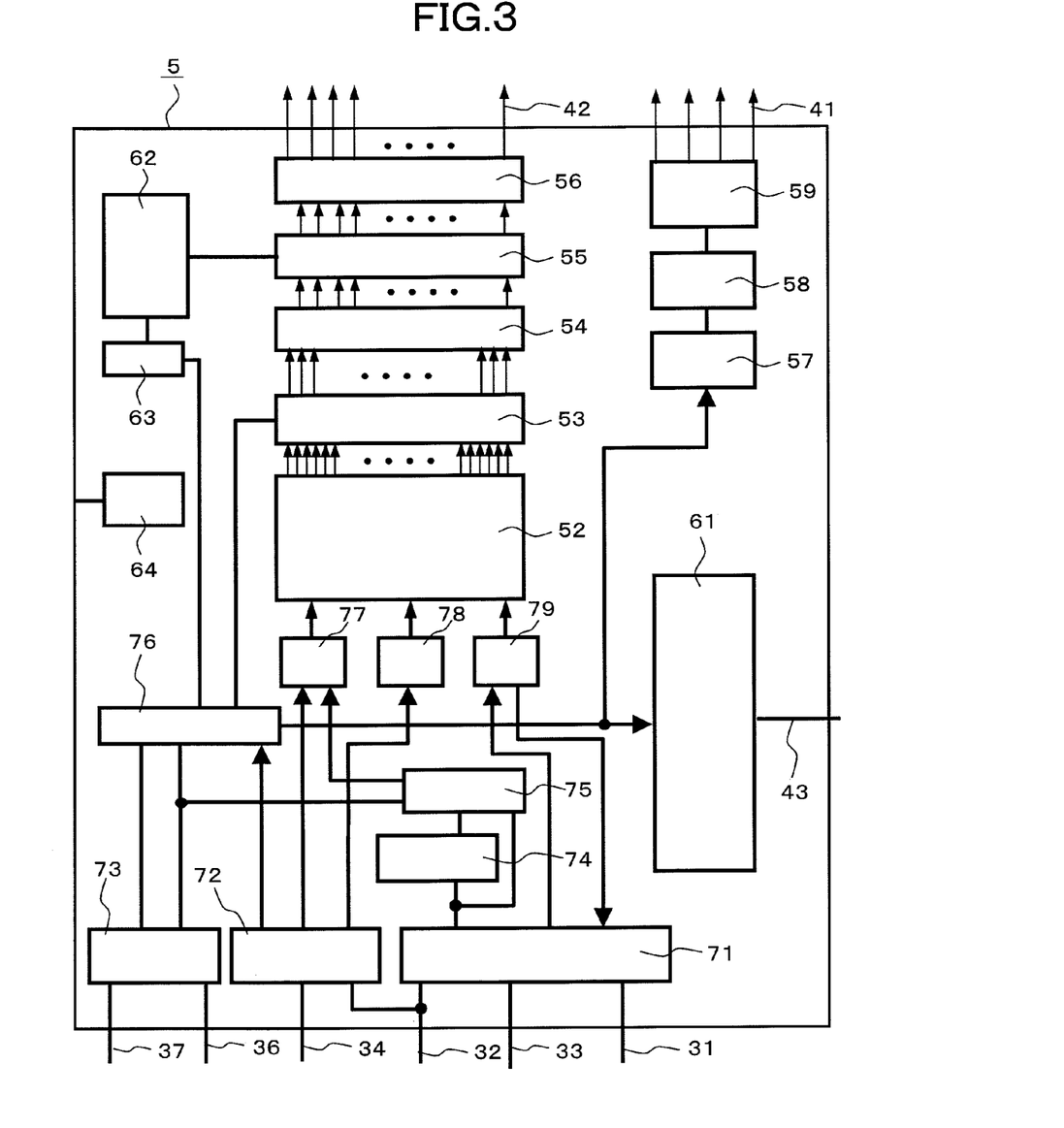
FIG. 3 is a schematic block diagram showing a driver circuit included in the liquid crystal display device according to each embodiment of the present invention.

FIG. 3 is a block diagram of the internal structure of the driver circuit 5. The driver circuit 5 includes a system interface 71, which receives a control signal and a video signal via an interconnection line 31 for external signal supply.

The system interface 71 has two kinds of interfaces, i.e., an arbitrary n-bit, e.g., 18-bit or 16-bit bus interface and a clock synchronous serial interface. The system interface 71 can support a parallel signal and a serial signal transmitted from the external control circuit, such as a micro processing unit (MPU).

The driver circuit 5 includes an index register 74 and a control register 75, which are 16-bit registers, and further includes a write data register 78 and a read data register 79, which are 18-bit registers. Data is read or written from/to each of those registers through the system interface 71. The interconnection line 31 serves as an input signal line and an interconnection line 32 serves as an input/output signal line. A verify signal output line 33 will be described later.

An external display interface 72 includes an RGB interface and a vertical synchronous interface for moving picture display and receives a video signal via an input signal line 34 for external signal supply. While the RGB interface is operating, the external display interface 72 receives display data in response to a vertical synchronizing signal and a horizontal synchronizing signal supplied from the outside.

While the vertical synchronous interface is operating, the external display interface 72 establishes synchronization between frames in response to a vertical synchronizing signal.

A memory element interface 73 is used for reading or writing data from/to the above-described memory element 70. The memory element interface 73 has an output signal line 37 and an input signal line 36 connected to the memory element 70. The memory element interface 73 designates the memory element 70 via the output signal line 37 and reads data stored in the memory element 70 via the input signal line 36.

The index register 74 stores access information related to the control register 75. The index register 74 can designate the address of the control register 75.

The control register 75 can designate various functions of the driver circuit 5. For example, the control register 75 contains bits to control a timing generating circuit 76, which will be described later. Setting each bit as a value of "1" or "0" can control an operation of the timing generating circuit 76.

The write data register 78 temporarily stores data to be written into the graphic RAM, indicated at 52. The write data register 78 writes the temporarily stored display data into the graphic RAM 52 through the external display interface 72 in accordance with a set value in the control register 75, a value in an address counter 77, which will be described later, and values of various control terminals.

The read data register 79 temporarily stores data read from the graphic RAM 52 and outputs the temporarily stored data to the outside in accordance with the set value in the control register 75, the value in the address counter 77, which will be described below, and the values of the various control terminals.

The address counter 77 gives an address to the graphic RAM 52. When an instruction to set an address is written into the index register 74, the index register 74 transfers address information to the address counter.

The graphic RAM 52 includes a static RAM (SRAM) for storing bit pattern data of 233,280 bytes with 18 bits per pixel and supports display subtended a maximum size of 240 RGB×432.

The timing generating circuit 76 generates a timing signal used to allow an internal circuit necessary for display to operate. Specifically, the timing generating circuit 76 generates a read timing signal for the graphic RAM 52 necessary for display, an internal-operation timing signal for an access from the outside, and an interface signal for the EPROM 70 which will be described later.

A latch circuit 53 temporarily holds digital data corresponding to 720 outputs of the video signal lines. When the latch circuit 53 prepares a signal to be output, the latch circuit 53 outputs all data prepared to a first level shifter 54.

The first level shifter 54 shifts the voltage level of a signal held by the latch circuit 53 to a level at which a decoder circuit 55 can be controlled.

The decoder circuit 55 outputs a gray scale voltage in accordance with an input signal. The voltage output from the decoder circuit 55 is current-amplified by a first output circuit 56. The resultant signal is output to video-signal output lines 42.

The terminals 42 for video-signal-line are electrically connected to the video signal lines 22 of the liquid crystal display panel, so that a gray scale signal is output to the video signal lines 22.

The driver circuit 5 further includes a scanning-signal generating circuit 57 for the scanning signal lines 21. The scanning-signal generating circuit 57 outputs a scanning timing signal. A second level shifter 58 shifts the voltage level of the scanning timing signal. A second output circuit 59 outputs a scanning signal to scanning-signal output terminals 41 for scanning signal lines.

A liquid-crystal drive-voltage generating circuit 61 generates a voltage necessary for driving the liquid crystal display panel and outputs the generated voltage through a voltage output terminal 43. A gray-scale-voltage generating circuit 62 generates a gray scale voltage and supplies the voltage to the decoder circuit 55.

A gamma ($\gamma$) control circuit 63 approximates the rate of increase/decrease of a gray scale voltage to the $\gamma$ function to achieve a change in luminance suitable for the characteristics of a human eye. A regulator 64 generates a logic power supply voltage.

The above-described circuits are controlled in accordance with instruction signals. The instruction signals for controlling the driver circuit 5 are broadly classified into the following seven groups:

(1) Index designation instruction;
(2) Status read instruction;
(3) Display control instruction;
(4) Power control instruction;
(5) Graphic data processing instruction;
(6) Graphic RAM access control instruction; and
(7) Internal gamma-level control instruction.

In the above-described broad classification, for example, the display control instruction signals of the group (3) are further divided into the following subgroups:

(a) Display control;
(b) Liquid crystal AC driving control;
(c) Non-display area AC driving control;
(d) Display and RAM access interface control;
(e) Entry mode setting;
(f) Display color control;
(g) Non-display area output control;
(h) Blanking period control;
(i) Frame frequency control; and
(j) Source and gate output position setting.

Each group of the broad classification contains many instruction signals which are further divided into small subgroups in a manner similar to the display control instruction signals. Accordingly, it is becoming difficult to understand the specifications of the respective instruction signals and use the signals.

Figure 4:
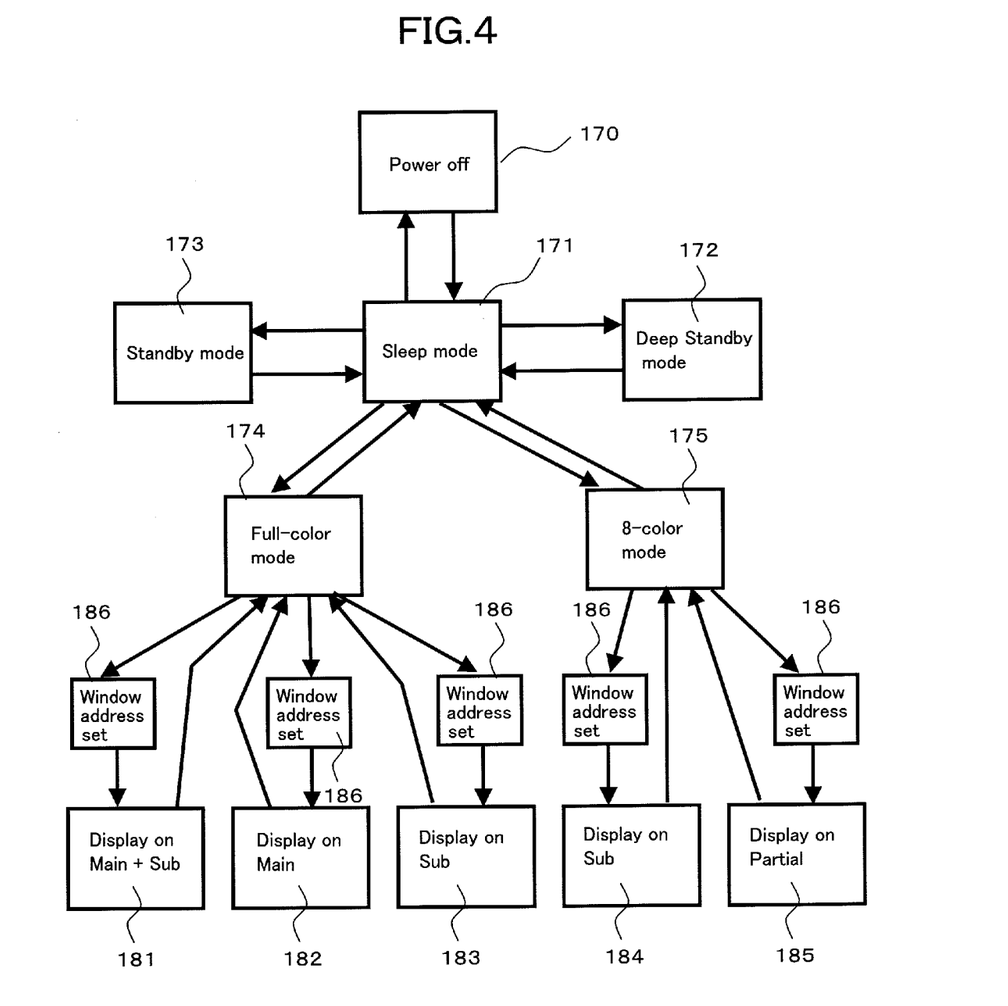
FIG. 4 is a schematic state transition diagram illustrating state transitions of the driver circuit in the liquid crystal display device according to the embodiment of the present invention.

FIG. 4 shows transitions between typical display modes. Changing a display mode to another display mode needs complicated setting of several instruction signals. Accordingly, basic states are set as typical modes in the transitions, as shown in FIG. 4. Command sequences for control of the transitions between the basic states are recorded onto the external EPROM 70. In the following description, the recorded command sequences will be called "execution sequences". An execution sequence is read and is then executed, so that a basic power or display sequence is realized using a simple instruction signal.

Table 1 contains the names of execution sequences for performing a transition shown in FIG. 4, the names of registers, start addresses in the external EPROM 70, and the number of words. Each register is set in accordance with an instruction signal.

TABLE 1

| Name of Register | Name of Execution Sequence | Start Address | Number of Words |
|---|---|---|---|
| SQFA | Amp on 262-thousand-color mode | 8'h00 | 21 |
| DPD | Display on Main + Sub | 8'h15 | 28 |
| DPM | Display on Main | 8'h31 | 28 |
| DPS | Display on Sub | 8'h4D | 28 |
| SQPA | Amp on 8-color mode | 8'h69 | 21 |
| DPPS | Display on Sub-Full | 8'h7E | 26 |
| DPPP | Display on Partial | 8'h98 | 30 |
| DPOF | Display off | 8'hB6 | 8 |
| SQOF | Amp off | 8'hBE | 6 |
| WSM | Window for Main | 8'hC4 | 5 |
| WSS | Window for Sub | 8'hC9 | 5 |
| WSD | Window for Main + Sub | 8'hCE | 5 |
| WSP | Window for Partial | 8'hD3 | 5 |
| GMS0 | Read γ-palette 1 | 8'hD8 | 10 |
| GMS1 | Read γ-palette 2 | 8'hE2 | 10 |
| GMS2 | Read γ-palette 3 | 8'hEC | 10 |
| GMS3 | Read γ-palette 4 | 8'hF6 | 10 |

Operations based on the respective execution sequences will now be described below.

Amp on 262-thousand-color mode: When the register SQFA is set to "1", an internal power supply circuit is activated in a 262-thousand-color display mode.

Display on main+sub: When the register DPD is set to "1", display is performed on both of main and sub screens in the 262-thousand-color display mode.

Display on main: When the register DPM is set to "1", display is performed on the main screen in the 262-thousand-color display mode.

Display on sub: When the register DPS is set to "1", display is performed on the sub screen in the 262-thousand-color display mode.

Amp on 8-color mode: When the register SQPA is set to "1", the internal power supply circuit is activated in an 8-color display mode.

Display on sub-full: When the register DPPS is set to "1", full-screen display is performed on the sub screen in the 8-color display mode.

Display on partial: When the register DPPP is set to "1", display is partially performed on each screen in the 8-color display mode.

Display off: When the register DPOF is set to "1", the display operation is stopped.

Amp off: When the register SQOF is set to "1", the internal power supply circuit is stopped.

Window for main: When the register WSM is set to "1", a window address indicating a display data write range in the graphic RAM 52 is set for display on the main screen. In addition, transferred display data is set so that the data can be written into the graphic RAM 52.

Window for sub: When the register WSS is set to "1", a window address indicating a display data write range in the graphic RAM 52 is set for display on the sub screen. In addition, transferred display data is set so that the data can be written into the graphic RAM 52.

Window for main+sub: When the register WSD is set to "1", a window address indicating a display data write range in the graphic RAM 52 is set for display on each of the main and sub screens. In addition, transferred display data is set so that the data can be written into the graphic RAM 52.

Window for partial: When the register WSP is set to "1", a window address indicating a display data write range in the graphic RAM 52 is set for partial screen display. In addition transferred display data is set so that the data can be written into the graphic RAM 52.

Read γ-palettes: When each of the registers GMS0 to GMS3 is set to "1", the value of each of γ palettes 1 to 4 is set.

An operation based on an execution sequence will now be described. In a transition caused by an execution sequence, a register corresponding to the execution sequence is set in accordance with an instruction signal. When the register is set, the execution sequence stored in the EPROM 70 is read. The read execution sequence is set to the control register 75 necessary for the transition. The control register 75 necessary for the transition is designated by the index register 74. Information about the control register 75 designated by the index register 74 is also recorded in the execution sequence. Setting the execution sequence to the control register 75 as described above enables a mode to change to a desired mode.

A transition to a basic state will now be described below with reference to FIG. 4. First, a power off state 170 changes to a sleep mode 171, serving as a basic state, in response to power on and power-on-reset. Conversely, the sleep mode 171 may change to the power off state 170 in response to power off.

Subsequently, the sleep mode 171 changes to either a standby mode 173 or a deep standby mode 172 when a target control register 75 is directly set. When a deep-standby-mode transition register is set, the sleep mode 171 changes to the deep standby mode 172. When a standby-mode transition register is set, the sleep mode 171 changes to the standby mode 173.

A transition between basic states based on an execution sequence will now be explained. First, to change the sleep mode 171 to a full-color mode 174, the register SQFA shown in Table 1 is set to "1", so that the "amp on 262-thousand-color mode" sequence of 21 words is read out from the start address "8'h00" in the EPROM 70. The 21 words of this sequence are set to the control register 75, so that the sleep mode 171 changes to the full-color mode 174.

To change the full-color mode 174 to a display on main+ sub mode 181, the register WSD is temporarily set to "1", so that the "window for main+sub" sequence of five words is read out from the start address "8'hCE" in the EPROM 70. The five words of this sequence are set to the control register 75, so that the full-color mode 174 changes to a window address set mode 186.

After that, the register DPD is set to "1", so that the "display on main+sub" sequence of 28 words is read out from the start address "8'h15" in the EPROM 70. The 28 words of this sequence are set to the control register 75, so that the window address set mode 186 changes to the display on main+sub mode 181.

To change the full-color mode 174 to a display on main mode 182, the register WSM is temporarily set to "1", so that the "window for main" sequence of five words is read out from the start address "8'hC4" in the EPROM 70. The five words of this sequence are set to the control register 75, so that the full-color mode 174 changes to the window address set mode 186.

After that, the register DPM is set to "1", so that the "display on main" sequence of 28 words is read out from the start address "8'h31" in the EPROM 70. The 28 words of this sequence are set to the control register 75, so that the window address set mode 186 changes to the display on main mode 182.

To change the full-color mode 174 to a display on sub mode 183, the register WSS is temporarily set to "1", so that the "window for sub" sequence of five words is read out from the start address "8'hC9" in the EPROM 70. The five words of this sequence are set to the control register 75, so that the full-color mode 174 changes to the window address set mode 186.

After that, the register DPS is set to "1", so that the "display on sub" sequence of 28 words is read out from the start address "8'h4D" in the EPROM 70. The 28 words of this sequence are set to the control register 75, so that the window address set mode 186 changes to the display on sub mode 183.

To change the sleep mode 171 to an 8-color mode 175, the register SQPA is set to "1", so that the "amp on 8-color mode" sequence of 21 words is read out from the start address "8'h69" in the EPROM 70. The 21 words of this sequence are set to the control register 75, so that the sleep mode 171 changes to the 8-color mode 175.

To change the 8-color mode 175 to an 8-color display on sub mode 184, the register WSS is temporarily set to "1", so that the "window for sub" sequence of five words is read out from the start address "8'hC9" in the EPROM 70. The five words of this sequence are set to the control register 75, so that the 8-color mode 175 changes to the window address set mode 186.

After that, the register DPPS is set to "1", so that the "display on sub-full" sequence of 26 words is read out from the start address "8'h7E" in the EPROM 70. The 26 words of this sequence are set to the control register 75, so that the window address set mode 186 changes to the 8-color display on sub mode 184.

To change the 8-color mode 175 to a display on partial mode 185, the register WSP is temporarily set to "1", so that the "window for partial" sequence of five words is read out from the start address "8'hD3" in the EPROM 70. The five words of this sequence are set to the control register 75, so that the 8-color mode 175 changes to the window address set mode 186.

After that, the register DPPP is set to "1", so that the "display on partial" sequence of 30 words is read out from the start address "8'h98" in the EPROM 70. The 30 words of this sequence are set to the control register 75, so that the window address set mode 186 changes to the display on partial mode 185.

To change the display on main+sub mode 181 to the full-color mode 174, the register DPOF is set to "1", so that the "display off" sequence of eight words is read out from the start address "8'hB6" in the EPROM 70. The eight words of this sequence are set to the control register 75, so that the display on main+sub mode 181 changes to the full-color mode 174.

Similarly, to change the display on main mode 182 or the display on sub mode 183 to the full-color mode 174, the register DPOF is set to "1", so that the "display off" sequence of eight words is read out from the start address "8'hB6" in the EPROM 70. The eight words of this sequence are set to the control register 75, so that the mode changes to the full-color mode 174.

To change the 8-color display on sub mode 184 or the display on partial mode 185 to the 8-color mode 175, similarly, the register DPOF is set to "1", so that the "display off" sequence of eight words is read out from the start address "8'hB6" in the EPROM 70. The eight words of this sequence are set to the control register 75, so that the mode changes to the 8-color mode 175.

To return the full-color mode 174 to the sleep mode 171, the register SQOF is set to "1", so that the "amp off" sequence of six words is read out from the start address "8'hBE" in the EPROM 70. The six words of this sequence are set to the control register 75, so that the full-color mode 174 changes to the sleep mode 171.

To return the 8-color mode 175 to the sleep mode 171, the register SQOF is set to "1", so that the "amp off" sequence of six words is read out from the start address "8'hBE" in the EPROM 70. The six words of this sequence are set to the control register 75, so that the 8-color mode 175 changes to the sleep mode 171.

As for a transition between the basic states, as described above, any of the previously recorded command sequences is read out from the EPROM 70, so that data is set to the necessary index register 74 and control register 75. Thus, a mode can be easily changed to a desired mode.

As described above, address areas in the EPROM 70 for storing the execution sequences are fixed. For example, the "amp on 262-thousand-color mode" sequence is fixed to an address area corresponding to 21 words started from the start address "8'h00" in the EPROM 70. Since each address area is fixed, setting a register to designate an execution sequence can be performed using a single command.

In other words, a start address indicating an address area in the EPROM 70 may be designated in order to designate an execution sequence. Accordingly, it is unnecessary to designate an end address and the number of words in addition to a start address.

Figure 5:
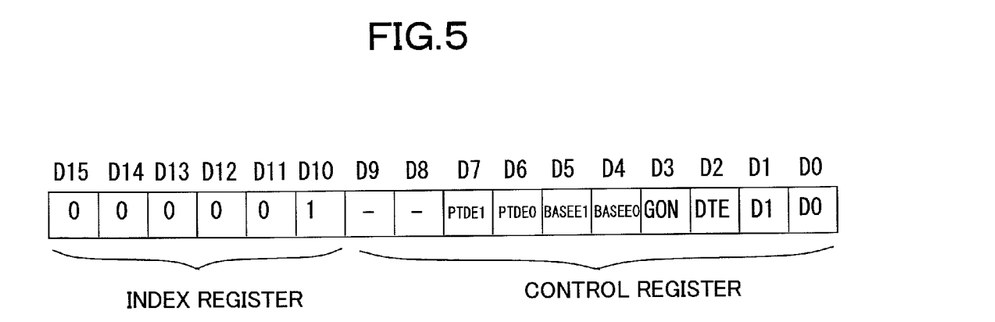
FIG. 5 is a schematic diagram showing a command written in a memory element used in the liquid crystal display device according to the embodiment of the present invention.

Each of respective commands for the execution sequences written in the EPROM 70 is composed of one word (16 bits) including an index register value and a control register value as shown in FIG. 5. A command read out from the EPROM 70 is configured such that upper six bits of the command indicate an index register value and lower ten bits thereof indicate a control register value.

For example, in the use of the auto-sequence function, a table representing the relationship between addresses in a memory element and index registers has to be prepared and an index register has to be designated using address information. According to the present embodiment, the address areas used to designate an execution sequence are fixed. Any command may be stored in a fixed address area.

Accordingly, an index register has to be designated using a command. An index register value is assigned to upper six bits of a command for an execution sequence. Lower four bits out of the upper six bits are the same as an index register value and upper two bits out of the upper six bits represent an index register for an execution sequence.

Each display mode supports a refresh command. The refresh command is used to recover from an abnormal condition caused by a register setting damage due to some accident during display. All of registers are periodically set in accordance with a refresh command. In addition, a display start sequence for each display mode and a power-on sequence are set using refresh commands. A user sets a refresh command and a display-on command. Internally, the power-on sequence is first executed and the display-on sequence is then executed.

The power-on sequence contains a display-off command. Unfortunately, when the power-on sequence is merely performed before execution of the refresh command, display is momentarily turned off in spite of a normal condition. To prevent such an event, a process of reading the display-off command, included in the power-on sequence, as a display-on command during refresh is performed.

Accordingly, it is unnecessary to provide a storage portion exclusively for refresh in a storage area of the EPROM 70 in order to change the display-off command to a display-on command. The storage area of the EPROM 70 can be minimized.

As described above, when an execution sequence stored in the EPROM 70 is performed, an inconvenient command is read as another command without making the user of the liquid crystal display device aware of the inconvenient command, thus maintaining the display quality.

When the EPROM 70 is not connected to the driver circuit 5, an input terminal of the EPROM 70 is fixed to a power supply. When each of upper six bits of data first read from the EPROM 70 indicates "0" or "1", a transfer operation is terminated.

The liquid crystal display device has a data verify function of outputting a signal at a "high" level from the verify signal output line 33, shown in FIG. 3, when a write error to the EPROM 70 is detected.

Figure 6:
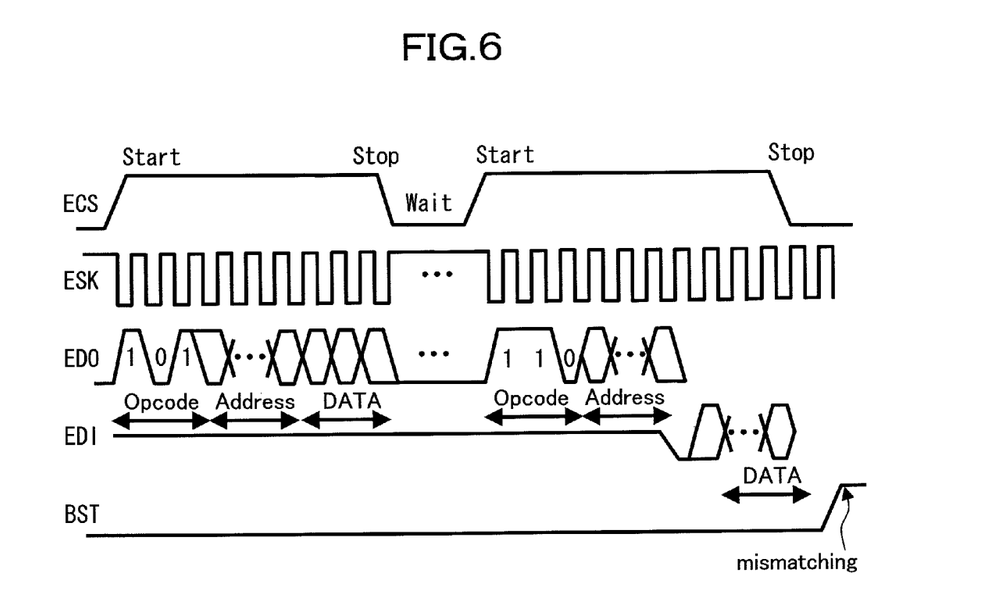
FIG. 6 is a timing diagram of a verify function of the liquid crystal display device according to the embodiment of the present invention.

FIG. 6 shows an operation of the data verify function. A signal ECS is output via one of the output signal lines 35 of the EPROM interface 73 shown in FIG. 3. When the output signal ECS becomes "high", the EPROM 70 is selected. When the signal at the "high" level is output from the output signal line 35, serial data EDO is simultaneously transmitted to the EPROM 70 via another output signal line 35. The leading three bits of the transmitted data indicate an operation code. In FIG. 6, the operation code "101" means a data write operation.

The transmitted data consists of a sequence of addresses and data segments. An arbitrary data segment of the transmitted data is written into a designated address in the EPROM 70. After a lapse of a predetermined period of time, a written data segment is read from the corresponding address. An operation code "110" indicates a data read operation. An address indicating an area where data has been written is designated following the operation code.

Serial data EDI is transmitted from the EPROM 70 via the input signal line 36. The driver circuit 5 holds written data and determines whether the written data matches data transmitted from the EPROM 70. When mismatching is determined, a high-level signal is output from a terminal BST, serving as one of the output signal lines 35. The high-level signal output from the terminal BST is held until the power is turned off or hardware is reset. When matching is determined, a low-level signal is output from the terminal BST.

Furthermore, a write error message generated by the driver circuit 5 may be displayed on the liquid crystal display panel 1. After assembly of the liquid crystal display device 100, when a write error message is displayed on the liquid crystal display panel 1 during inspection, the EPROM 70, serving as an external component, is replaced. Consequently, the error can be solved, thus improving the mass-productivity.

When detecting a write error, the driver circuit 5 drives the gate signal lines 21 and the drain signal lines 22 to display a write error message on the liquid crystal display panel 1. During inspection, a faulty EPROM 70 can be easily detected while it is being determined whether the liquid crystal display panel 1 displays an error message.

Figure 7:
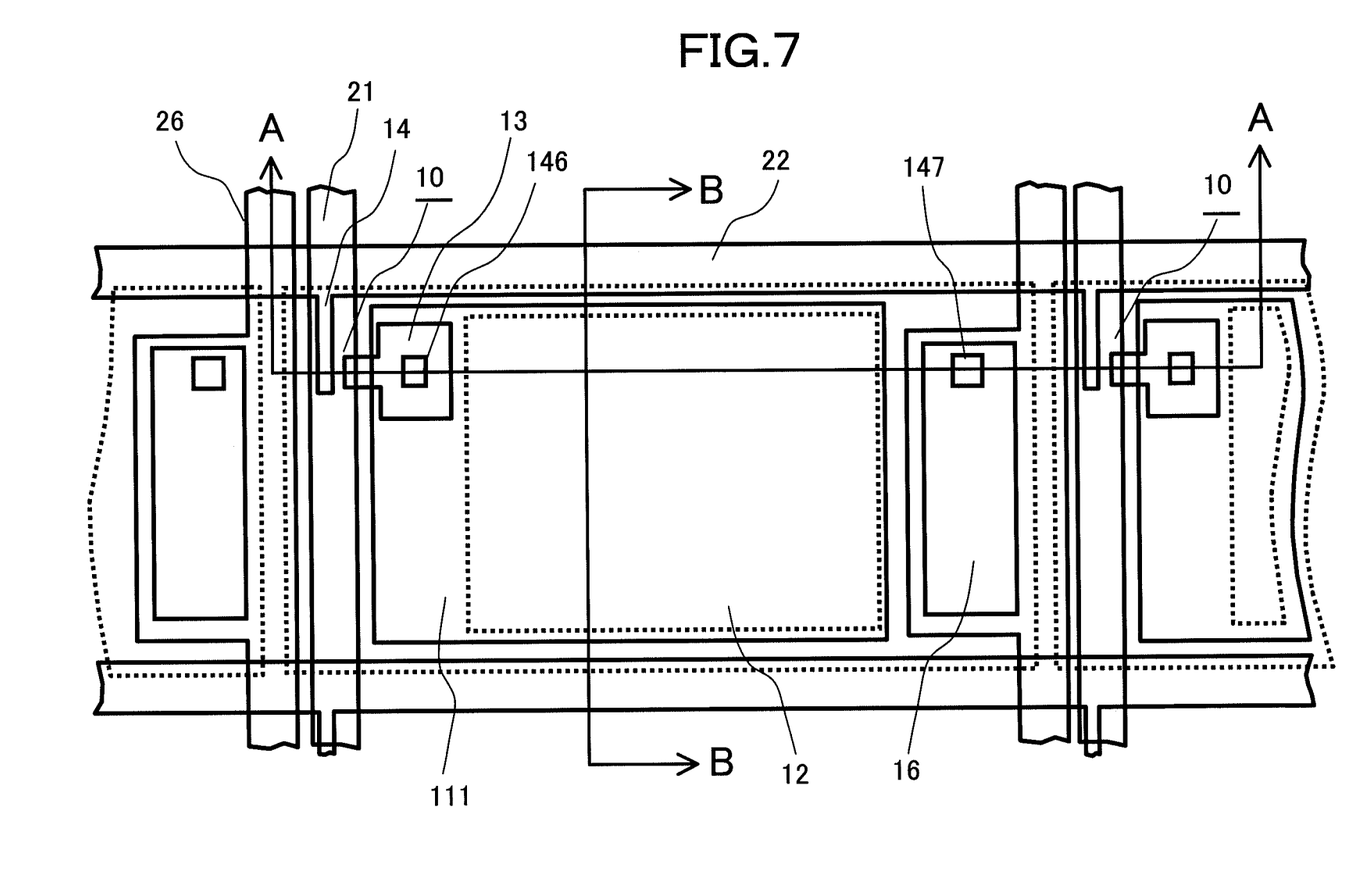
FIG. 7 is a schematic plan view of pixel portions in the liquid crystal display device according to the embodiment of the present invention.
Figure 8:
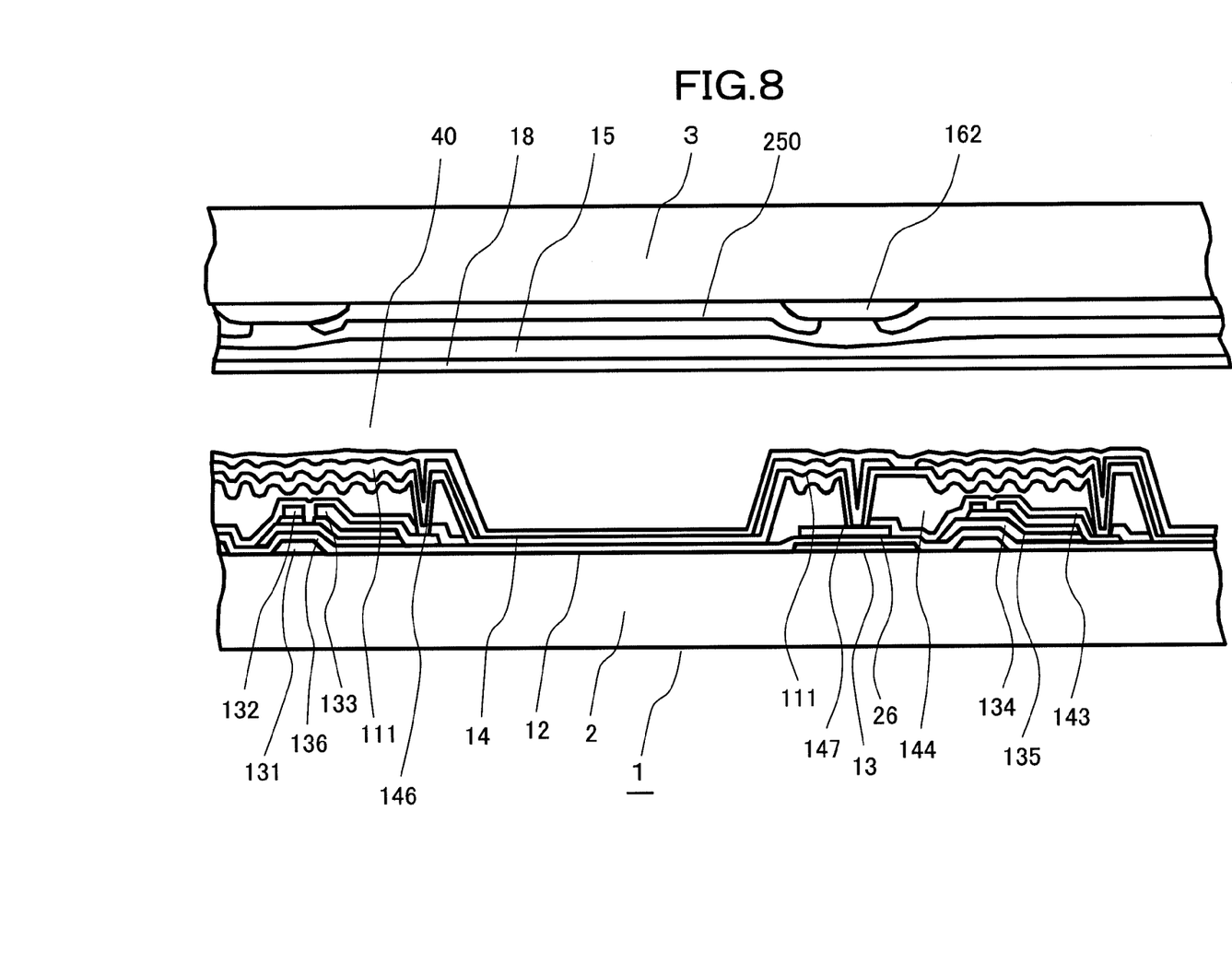
FIG. 8 is a schematic sectional view of the pixel portions in the liquid crystal display device according to the embodiment of the present invention.

FIG. 7 is a plan view of the pixel portions 8 of the liquid crystal display device 100. FIG. 8 is a sectional view taken along the line A-A in FIG. 7. FIGS. 7 and 8 show the pixel portions 8 of the vertical electric field type of liquid crystal display panel. The counter electrode 15 is disposed on a color filter substrate 3 such that the counter electrode 15 is opposed to reflective regions 111 (hereinafter, also referred to as reflective electrodes) and transmissive regions 12 (hereinafter, also referred to as transmissive electrodes).

The color filter substrate 3 includes red (R), green (G), and blue (B) color filters 250 and a light-shielding black matrix 162 disposed in the boundaries of the color filters 250. Referring to FIG. 7, capacitance lines 26 are arranged in parallel to the gate signal lines 21. One end of each reflective region 111 extends over the gate signal line 21 and overlaps the capacitance line 26. Two ends of each reflective region 111 are parallel to the gate signal lines 21 and the other two ends thereof are parallel to the drain signal lines 22.

Each reflective region 111 surrounds the corresponding transmissive region 12. The reflective region 111 is typically made of a metal that does not transmit light, for example, aluminum. Accordingly, the reflective region 111 functions as a light-shielding film that shields the transmissive region 12 from light.

To easily understand the structures of the pixel portions 8, each reflective region 111 is shown by a dotted line in FIG. 7.

A switching element (hereinafter, also referred to as a thin film transistor (TFT)) 10 is arranged in the vicinity of each of the intersections of the gate signal lines 21 and the drain signal lines 22. The TFT 10 is turned on in response to a gate signal supplied via the gate signal line 21 to write a video signal supplied from the drain signal line 22 into the transmissive electrode, serving as the transmissive region 12, and the reflective electrode, serving as the reflective region 111.

FIG. 8 is a sectional view taken along the line A-A in FIG. 7. The liquid crystal display panel 1 includes the TFT substrate 2 and the color filter substrate 3 opposed to each other. A liquid crystal composition 40 is held between the TFT substrate 2 and the color filter substrate 3. In addition, a seal (not shown) is arranged in the peripheries of the TFT substrate 2 and the color filter substrate 3 such that the seal, the TFT substrate 2, and the color filter substrate 3 constitute a container having a small capacity (space). The space between the TFT substrate 2 and the color filter substrate 3 is filled with the liquid crystal composition 4. Furthermore, alignment layers 14 and 18 for controlling the orientation of liquid crystal molecules are arranged in the TFT substrate 2 and the color filter substrate 3, respectively.

The TFT substrate 2 at least partially comprises transparent glass, resin, or semiconductor. As described above, the TFT substrate 2 has the gate signal lines 21 therein. Each gate signal line 21 comprises a multilayer film containing a layer mainly comprising chromium (Cr) or zirconium (Zr) and a layer mainly comprising aluminum (Al). The side surfaces of each gate signal line 21 are inclined such that the wide of the gate signal line 21 becomes wider toward the lower surface of the TFT substrate 2. Part of each gate signal line 21 serves as a gate electrode 131. The gate electrode 131 is covered with a gate insulating layer 136. The gate insulating layer 136 is overlaid with a semiconductor layer 134 comprising amorphous silicon. Upper part of the semiconductor layer 134 is doped with impurities and serves as an $n^+$ layer 135. The $n^+$ layer 135 is an ohmic contact layer for establishing good electrical connection with the semiconductor layer 134. A drain electrode 132 and a source electrode 133 are arranged in space-apart relationship on the $n^+$ semiconductor layer 135.

Each of the drain signal lines 22, the drain electrodes 132, and the source electrodes 133 is composed of a multilayer film including two layers, each of which comprises a chromium (Cr)-molybdenum (Mo) alloy or mainly comprises molybdenum (Mo) or tungsten (W), and a layer, mainly comprising aluminum, sandwiched between the two layers. Each source electrode 133 is electrically connected to the transmissive region 12 and the reflective region 111. In addition, each TFT 10 is covered with an inorganic insulating layer 143, which is overlaid with an organic insulating layer 144. Each source electrode 133 is connected to the reflective region 111 and the transmissive region 12 through a through-hole 146 arranged in the inorganic insulating layer 143 and the organic insulating layer 144. The inorganic insulating layer 143 may comprise silicon nitride or silicon oxide. The organic insulating layer 144 may be composed of an organic resin layer. The surface of each of the layers 143 and 144 can be relatively flattened. Alternatively, the surface of each of the layers 143 and 144 may be uneven.

Each reflective region 111, including a reflective electrode, has a conducting layer made of a high-reflectance metal, e.g., aluminum, on the light emitting surface. The reflective region 111 is composed of a multilayer film containing a layer mainly comprising tungsten or chromium and a layer mainly comprising aluminum. Each transmissive region 12 is composed of a transparent conducting layer. In the following description, the reflective electrode may be designated by reference numeral 11 and the transparent electrode may be designated by reference numeral 12.

The transparent conducting layer includes a light-transmissive conducting layer made of indium tin oxide (ITO), indium tin zinc oxide (ITZO), indium zinc oxide (IZO), zinc oxide (ZnO), tin oxide (SnO), or indium oxide ($In_2O_3$)

A layer mainly comprising chromium may comprise chromium or a chromium-molybdenum alloy. A layer mainly comprising zirconium may comprise zirconium or a zirconium-molybdenum alloy. A layer mainly comprising tungsten may comprise tungsten or a tungsten-molybdenum alloy. A layer mainly comprising aluminum may comprise aluminum or an aluminum-neodymium alloy.

The upper surface of the organic insulating layer 144 is made uneven by photolithography. Accordingly, the reflective electrode 111 on the organic insulating layer 144 is also uneven. The unevenness of the reflective electrode 111 increases the rate of scattering reflected light.

The organic insulating layer 144 and the inorganic insulating layer 143 on each transmissive electrode 12 are removed to form an opening. Each reflective electrode 111 surrounds the opening. The side walls of the opening are inwardly inclined toward the transmissive electrode 12. The reflective electrode 111 extending on the inclined side walls is electrically connected to the vicinity of the periphery of the transparent electrode 12.

Each capacitance line 25 is connected to a holding capacitance element 13. In addition, a holding capacitance electrode 26 is opposed to each holding capacitance element 13 with the inorganic insulating layer 143 therebetween to constitute a holding capacitor. Each holding capacitance electrode 26 is connected to the corresponding reflective electrode 111 through a through-hole 147 arranged in the organic insulating layer 144.

The holding capacitance elements 13 can be formed in a manner similar to the capacitance lines 25 using the same material as that for the gate signal lines 21 by the same processing step as that for the gate signal lines 21. In addition, the holding capacitance electrodes 26 can be produced using the same material as that for the drain signal lines 22 by the same processing step as that for the drain signal lines 22. When each holding capacitance electrode 26 is connected to the transparent electrode 12 in addition to the reflective electrode 111, the holding capacitance electrode 26 can satisfy a function as an electrode of the holding capacitor.

The invention claimed is:

1. A liquid crystal display device comprising:
 a first substrate and a second substrate;
 a liquid crystal composition sandwiched between the first and second substrates;
 a plurality of pixel electrodes arranged in the first substrate;
 a plurality of switching elements that each supply a video signal to the corresponding pixel electrode;
 a plurality of video signal lines for supplying the video signals to the switching elements;
 a plurality of scanning signal lines for supplying scanning signals for controlling the switching elements;
 a first driver circuit that outputs the video signals; and
 a second driver circuit that outputs the scanning signals, wherein
 the first and second driver circuits are formed on a single semiconductor chip,
 the liquid crystal display has a plurality of display modes that are driven by the first and second driver circuits,
 a control program for controlling the first and second driver circuits is stored in a memory element separated from the single semiconductor chip which the first and second driver circuits are formed on, and
 the control program includes command sequences, each comprised of a plurality of commands, for changing one of the display modes to another one of the display modes,
 the first and second driver circuits are coupled to receive the command sequences from the memory element and configured to execute the command sequences for changing the display mode.

2. The liquid crystal display device according to claim 1, wherein the memory element is mounted on a flexible printed circuit board, and the flexible printed circuit board is connected to the first substrate.

3. The liquid crystal display device according to claim 1, wherein when an abnormal condition of the memory element is detected, the first driver circuit outputs a signal indicating the occurrence of the abnormal condition to the video signal lines.

4. A liquid crystal display device comprising:
 a first substrate and a second substrate;
 a liquid crystal composition sandwiched between the first and second substrates;
 a plurality of pixel electrodes arranged in the first substrate;
 a plurality of switching elements that each supply a video signal to the corresponding pixel electrode;
 a plurality of video signal lines for supplying the video signals to the switching elements;
 a plurality of scanning signal lines for supplying scanning signals for controlling the switching elements;
 a first driver circuit that outputs the video signals; and
 a plurality of second driver circuits that output the scanning signals, wherein
 the first and second driver circuits are formed on a single semiconductor chip,
 the liquid crystal display has a plurality of display modes that are driven by the first and second driver circuits,
 a control program for controlling the first and second driver circuits is stored in a memory element separated from the single semiconductor chip which the first and second driver circuits are formed on,
 the control program includes command sequences, each comprised of a plurality of commands, for changing one of the display modes to another one of the display modes, and
 the memory element is coupled to the first and second driver circuit so that the control program controls the number of scanning signal lines driven by the second driver circuits.

5. The liquid crystal display device according to claim 4, wherein the memory element is mounted on a flexible printed circuit board, and the flexible printed circuit board is connected to the first substrate.

6. The liquid crystal display device according to claim 4, wherein when an abnormal condition of the memory element is detected, the first driver circuit outputs a signal indicating the occurrence of the abnormal condition to the video signal lines.

7. A liquid crystal display device comprising:
- a first liquid crystal display panel and a second liquid crystal display panel;
- a first driver circuit that supplies video signals to the first and second liquid crystal display panels; and
- a second driver circuit that supplies scanning signals to the first and second liquid crystal display panels, wherein
- the first and second driver circuits are formed on a single semiconductor chip,
- the liquid crystal display has a plurality of display modes that are driven by the first and second driver circuits,
- a control program for controlling the first and second driver circuits is stored in a memory element separated from the single semiconductor chip which the first and second driver circuits are formed on,
- the control program includes command sequences, each comprised of a plurality of commands, for changing one of the display modes to another one of the display modes, and
- the memory element is coupled to the first and second driver circuit so that the second driver circuit is switched between a first mode in which the first liquid crystal display panel is driven and a second mode in which the second liquid crystal display panel is driven in accordance with the control program.

8. The liquid crystal display device according to claim 7, wherein the memory element is mounted on a flexible printed circuit board, and the flexible printed circuit board is connected to the first substrate.

9. The liquid crystal display device according to claim 7, wherein when an abnormal condition of the memory element is detected, the first driver circuit outputs a signal indicating the occurrence of the abnormal condition to video signal lines.

* * * * *